Sept. 4, 1956

C E. DAVIS 2,761,295

TRANSMISSION DIRT SHIELD

Filed Oct. 4, 1955

C Edward Davis
INVENTOR.

BY *Clarence A. O'Brien
and Harvey B. Jacobson*
Attorneys

United States Patent Office 2,761,295
Patented Sept. 4, 1956

2,761,295

TRANSMISSION DIRT SHIELD

C Edward Davis, Houston, Tex.

Application October 4, 1955, Serial No. 538,351

5 Claims. (Cl. 64—1)

This invention generally relates to a protective device, and more specifically provides a dirt shield or boot for the rear of a transmission of an automotive vehicle or other associated mechanisms including a housing and a shaft rotatably and slidably mounted therein wherein it is desired to seal the shaft to prevent entrance of dirt or the like into the area between the shaft and the shaft housing.

In the construction of certain types of automotive vehicles employing an exposed drive shaft, the rear end of the transmission housing, extension shaft housing or overdrive housing normally supports a portion of the shaft in a bushing, and a grease seal is provided to retain lubricant within the transmission housing and yet permit rotation of the drive shaft as well as longitudinal sliding movement thereof caused by swinging movement of the rear axle and differential of the vehicle. Due to the fact that this mechanism is disposed beneath the car, considerable dust, water and dirt is normally thrown onto the surface of the drive shaft adjacent the rear end of the transmission housing wherein subsequent sliding and rotation of movement of the drive shaft within the end of the transmission housing will tend to destroy the grease seal and the bushing for supporting and sealing the shaft in the transmission housing. This is especially true in areas having unpaved roads when such roads become muddy, wherein considerable dirt, grit and other abrasive material may be splashed upon the sliding joint between the drive shaft and transmission housing. When the grease seal becomes scarred or damaged by such abrasives, lubricant leaks from the transmission housing, thereby causing possible damage to the gearing in the transmission and excessive wear thereof. Also, loss of the lubricant as well as action of the abrasives will cause excessive wear of the bushing supporting the shaft, thereby permitting the shaft to be improperly aligned so that excessive vibration of the drive train may occur therein. Accordingly, it is the primary object of the present invention to provide an external boot or dirt shield for the rear end of a transmission so that the sliding joint between the front yoke shaft and the transmission housing will be protected from the entrance of dirt between the housing and the yoke shaft.

Another object of the present invention is to provide an improved and novel transmission dirt shield constructed for attachment to the transmission housing and rotatably engaging the shaft with a friction reducing sealing disk for excluding dirt and foreign matter from the interior of the shield and also from the interior of the transmission housing.

Other important objects of the present invention will reside in its simplicity of construction, ease of assembly, adaptation for its particular purposes, and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
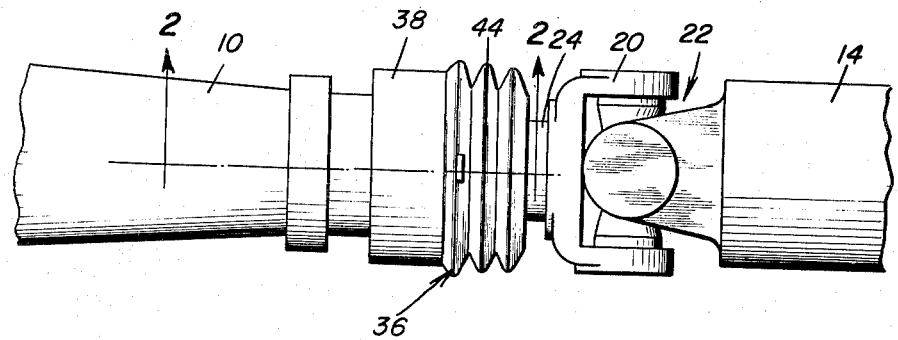
Figure 1 is a side elevational view of a portion of the final drive mechanism of an automotive vehicle illustrating the protective shield of the present invention positioned on the rear end of a transmission housing.
Figure 2:
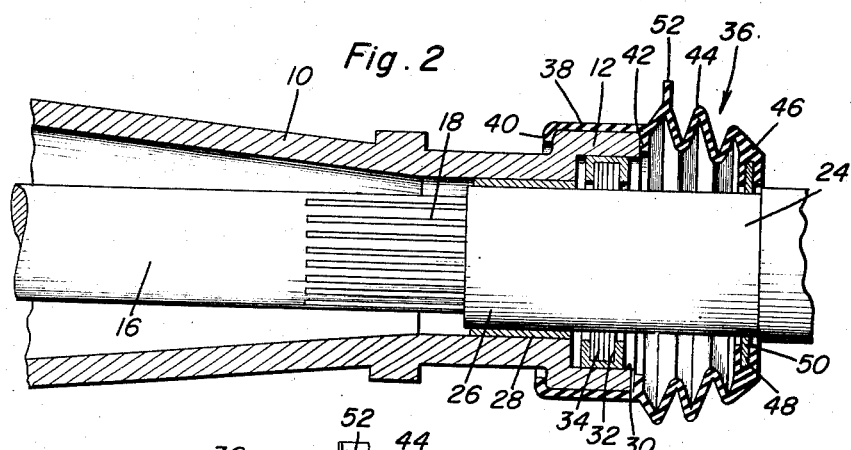
Figure 2 is a vertical sectional view taken substantially upon a plane passing along section line 2—2 of Figure 1 illustrating the internal details of construction of the present invention and its association with the transmission housing and drive train construction.
Figure 3:
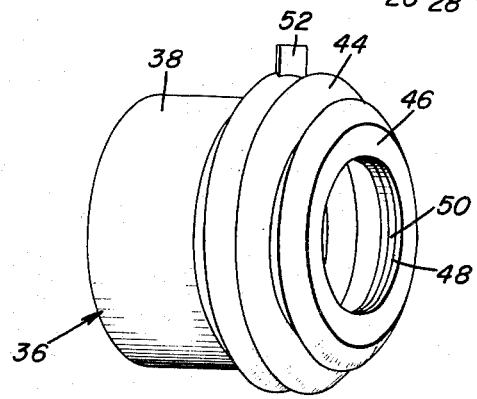
Figure 3 is a perspective view of the transmission shield of the present invention.

For the purposes of illustration, the rear end of a transmission housing or overdrive extension is illustrated and designated by the numeral 10 wherein such a housing is normally provided with an annular shoulder 12 at the extreme rear end thereof. This type of construction is that currently being employed in automotive vehicles, such as passenger cars produced by Ford Motor Company, wherein an exposed drive shaft 14 is employed for transmitting power to a rear axle which swings about a radius formed by the drive shaft 14 wherein the drive shaft 14 moves longitudinally to permit such movement of the rear axle of the vehicle since the rear axle of the vehicle cannot move longitudinally of the frame of the vehicle during vertical movement of the frame.

A splined shaft 16 which may either be the transmission shaft or the overdrive shaft is disposed in the housing 10 and is provided with male splines 18 at the rear end thereof. A front yoke 20 of a universal connection 22 is provided with a forwardly extending shaft 24 having a female splined portion 26 slidably and drivingly engaging the male splines 18 on the transmission shaft 16 wherein rotation of the shaft 16 will be transmitted through the universal connection 22 to the drive shaft 14. A cylindrical bushing 28 is provided between the forward portion of the female splined shaft 24 and the transmission housing 10 adjacent the rear end thereof. An annular recess 30 is provided in the rear of the housing 10 within the confines of the shoulder 12 for receiving an annular grease or lubricant seal 32 which has seal members 34 disposed therein for engaging the outer surface of the shaft 24, thereby sealing the lubricant within the housing 10 from leakage and also normally sealing any foreign matter from entry into the housing 10 and from entry between the bushing 28 and the splined portion 26 of the shaft 24. This seal 32 is subject to considerable damage and relatively short life since various abrasives, rocks, grit, water or the like are splashed onto the yoke shaft 24 during operation of a vehicle and such materials have an abrasive action with the sealing members 34 which are normally constructed of some type of soft pliable material wherein the seal 32 is rendered ineffective after a relatively short time which will permit leakage of lubricant from the transmission housing 10 with subsequent damage to the transmission. In order to prolong the life of the grease seal 32 as well as the bushing 28, a protective shield or boot generally designated by the numeral 36 is provided.

The shield 36 is generally a tubular member having a cylindrical portion 38 at one end thereof with an inwardly extending peripheral flange 40 at the edge thereof together with a similar inwardly extending peripheral flange 42 in spaced relation thereto for engaging the ends of the shoulder 12 of the transmission housing 10 for mounting the shield 36 thereon and supporting the same in proper position. Extending from the cylindrical portion 38 of the shield 36 is a plurality of bellows 44 which terminate at the other end of the shield 36 in a thickened portion 46 having an inwardly facing peripheral groove 48 therein with an annular disk 50 embedded therein wherein the annular disk 50 rotatably engages the yoke shaft 24. The disk 50 forms a seal and is an insert to permit free turning of the yoke shaft 24 within the boot 36 due to the low friction material from which it is constructed. The bellows members 44 permit the boot to absorb forward thrusting action of the differential and the drive shaft as well as movement of the yoke shaft 24, wherein the disk seal 50 will effectively protect the lubricant seal 32 from damage due to abrasive foreign matter entering the same. This also will eliminate entry of road dirt into the transmission housing 10 and prevent scoring of the shaft 24 as well as the bushing 28, thereby increasing the normal life expectancy of the grease seal 32, bushing 28, shaft 24 and the internal construction of the transmission housing. It is pointed out that the entire boot 36 forms substantially a ball-shaped member and is constructed of flexible resilient material of unitary construction and may be provided with a tab 52 to assist in the handling of the device in assembly and removal thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a transmission housing, a splined shaft disposed therein, a front yoke shaft having a female splined portion slidably engaged with the splined shaft to permit swinging movement of the rear end of the drive shaft, a dirt shield extending between the rear end of the transmission housing and the front yoke shaft, said dirt shield comprising a tubular member of bellows construction having an inwardly facing groove in one end thereof, a friction reducing seal ring disposed in said groove for engagement with the yoke shaft.

2. In combination with a transmission housing, a splined shaft disposed therein, a front yoke shaft having a female splined portion slidably engaged with the splined shaft to permit swinging movement of the rear end of the drive shaft, a dirt shield extending between the rear end of the transmission housing and the front yoke shaft, said dirt shield comprising a tubular member of bellows construction having an inwardly facing groove in one end thereof, a friction reducing seal ring disposed in said groove for engagement with the yoke shaft, said tubular member being constructed of flexible resilient material and having a pair of inwardly extending peripheral flanges disposed in spaced relation for engagement with a peripheral shoulder on the rear of the transmission housing.

3. A dirt shield comprising a tubular member of flexible resilient material having a portion thereof formed as a bellows to permit relative movement between the ends of the tubular member, one end of said tubular member having an inwardly facing groove receiving an annular disk seal adapted to engage a drive shaft, means on the other end of the tubular member adapted to engage the periphery of a drive shaft housing thereby preventing entrance of dirt between the housing and shaft.

4. A dirt shield comprising a tubular member of flexible resilient material having a portion thereof formed as a bellows to permit relative movement between the ends of the tubular member, one end of said tubular member having an inwardly facing groove receiving an annular disk seal adapted to engage a drive shaft, means on the other end of the tubular member adapted to engage the periphery of a drive shaft housing thereby preventing entrance of dirt between the housing and shaft, said means including an inwardly facing channel formed by spaced flanges adapted to engage a shoulder on the shaft housing.

5. A boot for the rear end of a drive shaft housing having an annular shoulder at the end thereof, a male splined shaft disposed in said housing, a female splined shaft slidably engaging the male splined shaft and extending longitudinally from the housing, a bushing disposed between the female splined shaft and housing adjacent the end of the housing, a lubricant seal disposed between the female splined shaft and housing at the rear end of the housing, said boot comprising a bellows tubular member constructed of flexible resilient material, said tubular member having a pair of inwardly extending longitudinally spaced flanges engaging the ends of the shoulder for mounting the tubular member on the housing in sealed relation, the other end of the tubular member having an inwardly facing groove, an annular disk disposed in said groove and engaging the female splined shaft, said disk being constructed of friction reducing material to permit rotation and sliding movement of the female splined shaft and preventing entry of foreign matter into the lubricant seal and bushing between the housing and the female splined shaft.

No references cited.